United States Patent
Gorka et al.

(10) Patent No.: US 9,908,430 B2
(45) Date of Patent: Mar. 6, 2018

(54) VEHICLE HAVING AN ELECTRIC MACHINE AND TWO ONBOARD POWER SUBSYSTEMS

(71) Applicant: Bayerische Motoren Werke Aktiengesellschaft, Munich (DE)

(72) Inventors: Matthias Gorka, Munich (DE); Joerg Reuss, Unterschliessheim (DE); Daniel Findeisen, Erding (DE); Michael Steinberger, Koefering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/801,359

(22) Filed: Jul. 16, 2015

(65) Prior Publication Data
US 2015/0321578 A1     Nov. 12, 2015

Related U.S. Application Data

(63) Continuation of application No. PCT/EP2013/076363, filed on Dec. 12, 2013.

(30) Foreign Application Priority Data

Jan. 17, 2013    (DE) ........................ 10 2013 200 674

(51) Int. Cl.
*H02P 21/00*      (2016.01)
*B60L 11/18*      (2006.01)
(Continued)

(52) U.S. Cl.
CPC ....... *B60L 11/1877* (2013.01); *B60L 11/1803* (2013.01); *B60L 11/1868* (2013.01);
(Continued)

(58) Field of Classification Search
CPC .... H02P 21/0035; H02P 21/06; H02P 21/146; H02P 2207/05; Y02T 10/643
(Continued)

(56) References Cited

U.S. PATENT DOCUMENTS 6,066,928 A * 5/2000 Kinoshita ................. B60L 7/10
                                                   180/65.8
6,548,984 B2 * 4/2003 Shamoto ........... H02M 7/53873
                                                   318/801

(Continued)

FOREIGN PATENT DOCUMENTS

| DE | 102 44 229 A1 | 4/2003 |
| DE | 103 42 049 A1 | 5/2005 |
| DE | 10 2011 003 372 A1 | 8/2011 |

OTHER PUBLICATIONS

International Search Report dated Oct. 9, 2014 (Three (3) pages).
(Continued)

*Primary Examiner* — Rina Duda
(74) *Attorney, Agent, or Firm* — Crowell & Moring LLP

(57) ABSTRACT

A vehicle with an N-phase electric motor, with a first onboard electrical subsystem and with a second onboard electrical subsystem, wherein the electric motor includes a rotor and a stator system, and the first onboard electrical subsystem includes an inverter. The stator system is associated with the inverter and the electric motor is operable with an inverter controller according to the principle of field-oriented control such that the stator system is embodied in a star circuit in which the star point can be connected to the second onboard electrical subsystem directly or via a star point switch. The inverter controller includes a current controller and a star point controller, wherein the current controller controls phase currents of the stator system and the star point controller controls a star point current.

16 Claims, 1 Drawing Sheet

(51) Int. Cl.
  *H02P 6/08* (2016.01)
  *H02P 21/10* (2016.01)
  *B60L 15/02* (2006.01)

(52) U.S. Cl.
  CPC ............. *B60L 15/02* (2013.01); *B60L 15/025* (2013.01); *H02P 6/085* (2013.01); *H02P 21/10* (2013.01); *B60L 2220/10* (2013.01); *B60L 2220/50* (2013.01); *Y02T 10/641* (2013.01); *Y02T 10/643* (2013.01); *Y02T 10/7005* (2013.01); *Y02T 10/7066* (2013.01)

(58) Field of Classification Search
  USPC ............................ 318/400.02, 798, 800, 801
  See application file for complete search history.

(56) References Cited

U.S. PATENT DOCUMENTS

| | | | | |
|---|---|---|---|---|
| 6,806,671 B2 * | 10/2004 | Kusaka | ............. | B60L 1/00 318/108 |
| 7,098,624 B2 * | 8/2006 | Kusaka | ............. | B60L 3/0023 318/727 |
| 7,102,903 B2 * | 9/2006 | Nakamura | ............. | H02P 27/08 318/139 |
| 7,402,919 B2 * | 7/2008 | Ishikawa | ............. | B60K 6/26 290/40 C |
| 7,816,805 B2 * | 10/2010 | Tanaka | ............. | B62D 5/046 307/10.1 |
| 7,969,104 B2 * | 6/2011 | Taniguchi | ............. | B62D 5/046 310/198 |
| 7,982,426 B2 * | 7/2011 | Itoh | ............. | H02M 7/5387 318/108 |
| 2010/0123418 A1 * | 5/2010 | Itoh | ............. | H02P 21/0089 318/400.02 |
| 2010/0181829 A1 | 7/2010 | Ichikawa et al. | | |
| 2010/0320945 A1 * | 12/2010 | Taniguchi | ............. | H02P 23/08 318/400.02 |
| 2011/0187301 A1 | 8/2011 | Stancu et al. | | |

OTHER PUBLICATIONS

German Search Report dated Mar. 19, 2013, with Statement of Relevancy (Six (6) pages).

* cited by examiner

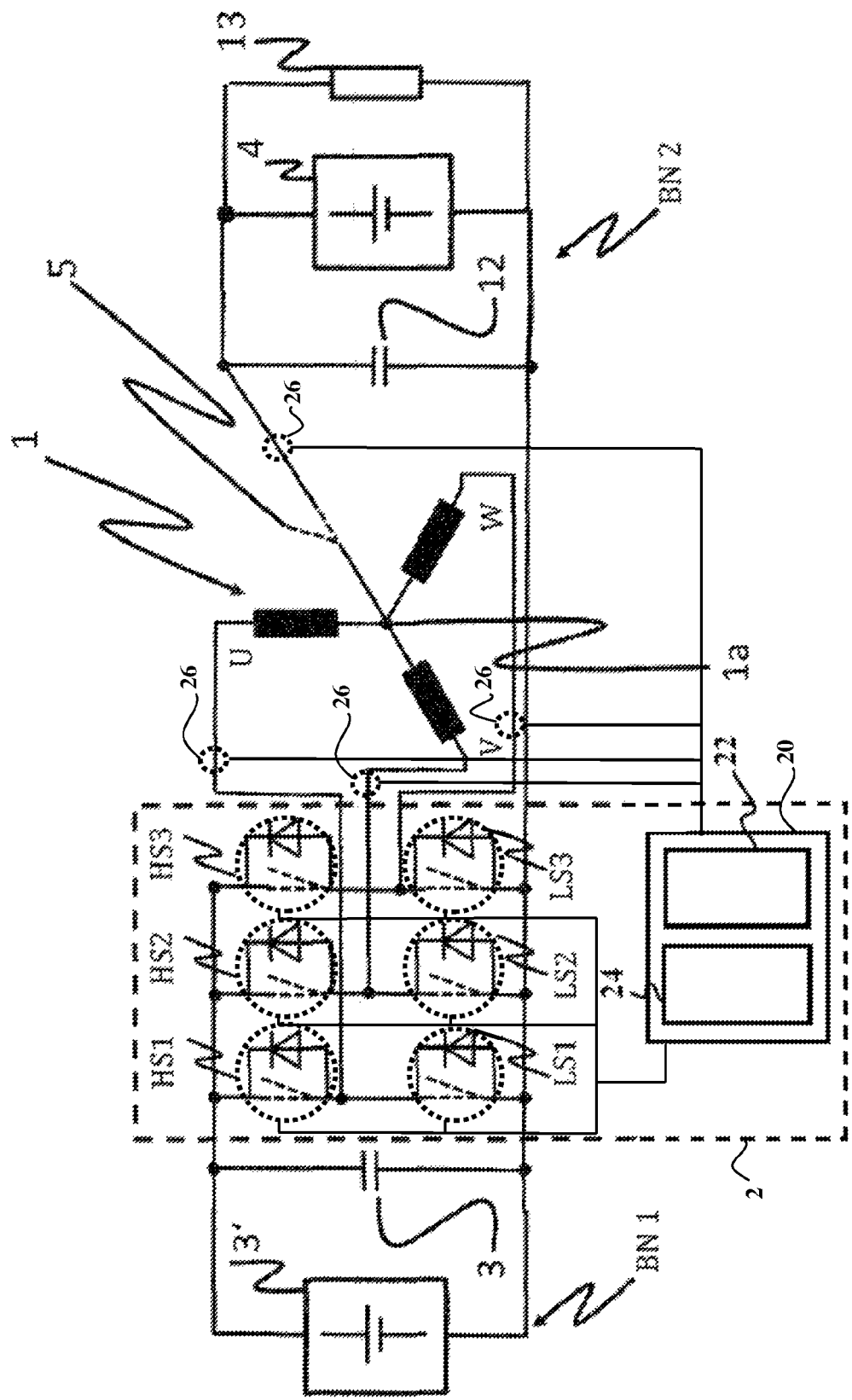

VEHICLE HAVING AN ELECTRIC MACHINE AND TWO ONBOARD POWER SUBSYSTEMS

CROSS REFERENCE TO RELATED APPLICATIONS

This application is a continuation of PCT International Application No. PCT/EP2013/076363, filed Dec. 12, 2013, which claims priority under 35 U.S.C. § 119 from German Patent Application No. 10 2013 200 674.8, filed Jan. 17, 2013, the entire disclosures of which are herein expressly incorporated by reference.

BACKGROUND AND SUMMARY OF THE INVENTION

The invention relates to a vehicle with an N-phase electric motor, with a first onboard electrical subsystem and with a second onboard electrical subsystem, the electric motor comprising a rotor and a stator system, the first onboard electrical subsystem comprising an inverter, the stator system being associated with the inverter, and the electric motor being operable with an inverter controller according to the principle of field-oriented control.

In a vehicle, components that constitute electrical power consumers are usually supplied with power by an onboard electrical system with a nominal voltage level of 14 volts. A secondary 12-volt energy storage, which assumes the function of a power source or the function of an energy sink in the onboard electrical system depending on the operational situation, and a 14-volt generator are then designed to generate electrical power output of 2-3 kW needed in the vehicle.

Especially if several consumers with an elevated a higher power consumption output requirement are integrated into the onboard electrical system of the vehicle, the onboard electrical system can have two onboard electrical subsystems. Then a DC/DC converter transfers electrical power between the two onboard electrical subsystems. The electric motor, which can also be motor-operable in a vehicle with electrified power train, has, as at least one energy store per onboard electrical subsystem, the function of an electrical power source or sink in the vehicle. Such an onboard electrical system topology is disclosed in DE 102 44 229 A1, for example.

It is an object of the invention to describe an improved vehicle with a multiphase electric motor, with a first onboard electrical subsystem and with a second onboard electrical subsystem, the electric motor comprising a rotor and a stator system, the first onboard electrical subsystem comprising an inverter, the stator system being associated with the inverter, and the electric motor being operable with an inverter controller according to the principle of field-oriented control.

This object is achieved by a vehicle according to the independent claims. Advantageous embodiments and developments of the invention follow from the dependent claims.

According to the invention, the stator system is embodied in a star circuit, the star point is connected to the second onboard electrical subsystem or can be connected via a star point switch to the second onboard electrical subsystem, and the inverter controller comprises a current controller and a star point controller.

This means that the star point of the electric motor can be connected via the star point switch with the electrical potential of the second onboard electrical subsystem or permanently connected. This enables current to flow over the star point, which is referred to as star point current. The star point current is thus introduced into the motor as an additional degree of freedom, provided that it is connected via the star point switch to the second onboard electrical subsystem. The control principle of the electric motor is expanded by adding a star point controller to the inverter controller, which controls the electric motor and has a current controller for the stator system. By virtue of the star point controller, the current can be controlled via the star point. For example, the second onboard electrical subsystem can be formed by electrical consumers or, alternatively or in addition, by another stator system in the star or delta circuit of an electric motor. In addition, a DC link capacitor can be associated with the inverter.

According to one preferred embodiment of the invention, at least one number of N−1 phase currents can be measured from the number of N-phase currents of the stator system, the measured phase currents can be transformed via an enhanced Clarke-Park transformation into a field-oriented current representation with a field-building component, with a torque building component and with a current zero component, the star point current being three times the current zero component.

A permanent electrical connection is to be understood as a non-open and non-openable current path. This means, for example, that diodes can be introduced in the current path.

Accordingly, the electric motor can be controlled according to the principle of field-oriented control, with which a person skilled in the art is familiar. According to this principle, two phase currents of the stator system are measured and transformed via a two-dimensional Clarke-Park transformation into two rotor-fixed current values—like in a three-phase electric motor, for instance. The two rotor-fixed current values refer to a field-building current component and a torque-building current component. The transformation is done by a control unit, e.g., by a control device.

According to one preferred embodiment, two phase currents and the star point current are measured or, alternatively, the three phase currents are measured.

During measurement of the three phase currents, they are fed to an enhanced three-dimensional Clarke-Park transformation, which is a modified version of the two-dimensional Clarke-Park transformation known to a person skilled in the art. Besides the field-building current component and the torque-building current component, a zero current component is obtained as an additional component. This zero current component is one-third of the star point current, i.e., of the current flow over the star point of the electric motor.

In general, that is, in any multiphase electric motor, a number of current measurement points are provided overall by means of current measurement means which corresponds at least to the number N of the phases of the electric motor.

Furthermore, it is especially advantageous if the inverter controller has the field-building current component as a control variable, the torque-building current component as a control variable, the zero current component as a control variable, a first reference current value for the field-building current component as a reference value, and a second reference current value for the torque-building current component as a reference value, and a star point reference current for the star point controller as a reference value, and outputs a first stator control voltage associated with the field-building current component as an actuating variable, outputs a second stator control voltage associated with the torque-building current component as an actuating variable, and outputs a third stator control voltage associated with the zero current component as an actuating variable.

The third reference current value is directly associated with the star point current due to the correlation between the zero current component and the star point current. The third stator control voltage is therefore to be regarded as the actuating variable of the star point controller, while the first and second stator control voltage serve as actuating variables of the stator (current) controller.

According to one especially preferred embodiment of the invention, the current controller and the star point controller are embodied substantially as PI controllers.

The design of the current controller and star point controller as a robust PI controller is especially advantageous due to the controlled system that describes the correlation between the values of the electric motor such as speed, taken torque, incoming torque, angular position of the rotor relative to the stator, magnetic fluxes through stator and rotor as well as phase voltages and phase currents.

Alternatively, control circuits with dynamics and precision comparable to PI controllers and also less complexity can also be used, such as PID controllers or controllers with a feed forward control.

According to another embodiment of the present invention, the N-phase electric motor is embodied as a 3-phase electric motor and the inverter comprises six inverter switches which are arranged in three half bridges for the three phases of the stator system, and the inverter, in a switching cycle according to the principle of pulse-width modulation, switches the phase voltage for each of the phases, the first stator control voltage, the second stator control voltage and the third stator control voltage being transformable by means of an enhanced inverse Clarke-Park transformation into the phase voltages of the stator system to be switched.

The phase voltages to be switched are thus determined by a modified inverse Clarke-Park transformation, the modification of the inverse Clarke-Park transformation corresponding to the modification of the Clarke-Park transformation to the enhanced Clarke-Park transformation. The obtained phase voltages can be switched by the inverter in a pulse-width-modulated manner, i.e., the phase voltage is set through switching of the respective half bridge center to the higher potential of the first onboard electrical subsystem for a certain switching time through opening of the inverter switch between the half bridge center and the lower potential of the first onboard electrical subsystem and closing of the half bridge, the ratio of the switching time to the cycle time being directly proportional to the phase voltage to be set. The phase voltage is thus set in the time average of a cycle.

According to another variant of the invention, the electric motor, with closed star point switch and with a star point current with a direction of flow from the star point to the second onboard electrical subsystem, brings about a transfer of electrical power from the first onboard electrical subsystem to the second onboard electrical subsystem.

This means that, if a target star point current is prescribed for and set in the electric motor that corresponds to a current flow from the star point to the second onboard electrical subsystem, the electric motor acts as a step-down converter.

According to another variant of the invention, the electric motor, with closed star point switch and with a star point current with a direction of flow from the second onboard electrical subsystem to the star point, brings about a transfer of electrical power from the second onboard electrical subsystem to the first onboard electrical subsystem.

This means that, if a target star point current is prescribed for and set in the electric motor that corresponds to a current flow from the second onboard electrical subsystem to the star point, the electric motor acts as a step-up converter.

Furthermore, if the star point switch is closed by prescribing the target star point current and adjusting the star point control voltage, a star point current can be set that corresponds to a current flow from the second onboard electrical subsystem to the star point or from the star point to the second onboard electrical subsystem.

The electric motor thus acts as a bidirectional power controller. This applies both to a rotating and stationary rotor.

A preferred exemplary embodiment of the invention is described below on the basis of the enclosed schematic drawing. Additional details, preferred embodiments and developments of the invention are revealed.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a vehicle with two onboard electrical subsystems, electric motor and star point switch.

DETAILED DESCRIPTION OF THE DRAWINGS

The embodiment according to FIG. 1 shows, for the sake of example, an N-phase motor embodied as a three-phase electric motor with a rotor and a stator system (1). The three phases are designated as (u, v, w). An inverter (2) and an DC link capacitor (3) are associated with the electric motor. The electric motor, the inverter and the DC link capacitor are components of a first onboard electrical subsystem (BN1) of a vehicle. In addition, this onboard electrical subsystem has at least one electrical energy storage (3'), which can be embodied as an electrochemical energy storage. The control of the electric motor, which can be operated both by generator and electrically, is done via the inverter according to the principle of field-oriented control (FOC), which is known to a person skilled in the art. For this purpose, the inverter is preferably embodied as a bridge converter, i.e., an electrical half bridge of the inverter is associated with each phase of the electric motor. A half bridge consists of a series connection of two switches, the switch associated with the higher electrical potential being referred to respectively as a high-side switch (HS1, HS2, HS3) and the switch associated with the lower electrical potential being referred to respectively as a low-side switch (LS1, LS2, LS3).

Alternatively to a bridge converter, a multilevel converter can also be used. Without posing a restriction of this generality, we will continue to assume that a bridge converter is being used.

In addition, the vehicle has a second onboard electrical subsystem (BN2) comprising, for example, a second electrical energy storage (4) with an optional intermediate circuit capacitor (12) and electrical consumers (13). The second onboard electrical subsystem can exhibit different embodiments. What they have in common is that the lower electrical potential of the second onboard electrical subsystem corresponds to the low electrical potential of the first onboard electrical subsystem. In particular, there is no electrical connection between the higher electrical potential of the second onboard electrical subsystem and the higher electrical potential of the first onboard electrical subsystem.

However, the star point (1a) of the electric motor is permanently electrically connected to the higher potential of the second onboard electrical subsystem, or it can be connected electrically via a switch, which is referred to as a star point switch (5).

According to additional embodiments of the second onboard electrical subsystem, it comprises a stator which can preferably be interconnected preferably in a star circuit, alternatively in a delta circuit. Then the star point (1a) can be connected to the star or to the delta circuit of the second onboard electrical subsystem or is connected via the star point switch.

The phase currents of the electric motor ($I_u$, $I_v$, $I_w$) can be measured. The measured phase currents are fed to the following transformation:

$$\begin{bmatrix} I_d \\ I_q \\ I_0 \end{bmatrix} = 2/3 \cdot \begin{bmatrix} \cos(\beta_{el}) & \cos(\beta_{el}-120°) & \cos(\beta_{el}+120°) \\ -\sin(\beta_{el}) & -\sin(\beta_{el}-120°) & -\sin(\beta_{el}+120°) \\ \frac{1}{2} & \frac{1}{2} & \frac{1}{2} \end{bmatrix} \cdot \begin{bmatrix} I_u \\ I_v \\ I_w \end{bmatrix}. \quad \text{(Equation 1)}$$

where $$\beta_{el} = \beta_{mech} \cdot Z_p$$

and $\beta_{el}$ refers to the electrical angle of the rotor and $Z_p$ to the number of pole pairs of the electric motor.

The result of the transformation from (equation 1) is a field-oriented current vector ($I_d$, $I_q$, $I_0$), the component $I_d$ corresponding to a field-building component and the component $I_q$ corresponding to a torque-building component.

With regard to the components $I_d$ and $I_q$, the transformation corresponds to a Clarke-Park transformation known to a person skilled in the art, i.e., a 2×2 matrix of the 3×3 matrix from equation 1 corresponds to the Clarke-Park matrix. In equation 1, this is expanded in a clever manner to a 3×3 matrix, so that the obtained zero current component ($I_0$) corresponds to one-third of the star point current ($I_{star}$). The 3×3 matrix constitutes the so-called enhanced Clarke-Park transformation.

This means that the measurement of the three phase currents via the transformation from equation 1 and tripling of the zero current component leads to the star point without it being detected by measurement technology. In a three-phase motor, and due to the clever expansion of the 2×2 Clarke-Park matrix to the expanded 3×3 Clarke-Park matrix, this results from the following relationships of the electric motor:

The star current is formed by the sum of the phase currents according to:

$$I_{star} = I_U + I_V + I_W$$

Each of the phase currents is a sinusoidal current with an offset $I_0$, the offset being controlled uniformly over the phases and the uniform distribution being a control objective (for stator current controller, see below):

$$I_{U,V,W} = \hat{I}_{U,V,W} \sin(\omega t + \varphi) + I_0 \quad \text{(Equation 1a)}$$

The star current thus follows from Kirchhoff's first law as:

$$I_{star} = [\hat{I}_U \sin(\omega t + 0°) + I_0] + [\hat{I}_V \sin(\omega t - 120°) + I_0] + [\hat{I}_W \sin(\omega t + 120°) + I_0]$$

The sum of the three sinusoidal currents each offset by 120° (corresponding to the stator construction of the 3-phase motor) of the same amplitude results in zero. The uniformness of the amplitudes $\hat{I}_{U,V,W}$ is also a control objective in field-oriented control and a central element for the symmetry of the stator system. $I_{star}$ is thus simplified to:

$$I_{star} = 3 \cdot I_0$$

The Clarke-Park transformation from equation 1, in turn, leads to:

$$I_0 = 2/3 \cdot \begin{bmatrix} 1/2 & 1/2 & 1/2 \end{bmatrix} \cdot \begin{bmatrix} I_u \\ I_v \\ I_w \end{bmatrix}.$$

which, through insertion of equation 1a, leads to:

$$I_0 = 2/3 \cdot \left[ \frac{1}{2} \cdot (I_u \cdot \sin(\omega t + 0°) + I_0) + \frac{1}{2} \cdot (I_v \cdot \sin(\omega t - 120°) + I_0) + 1/2 \cdot (I_w \cdot \sin(\omega t + 120°) + I_0 \right].$$

Trigonometric shaping results in $$I_0 = \frac{2}{3} \cdot \left[ \frac{1}{2} \cdot I_0 + \frac{1}{2} \cdot I_0 + \frac{1}{2} \cdot I_0 \right] = \frac{2}{3} \cdot \frac{3}{2} \cdot I_0 = I_0,$$

which shows that the determination of the zero current component through equation 1 corresponds to a measurement of the star point current.

The basic condition of the Clarke-Park transformation is usually $I_{star} = 0$ A. The following thus holds for the enhanced Clarke-Park transformation: $\frac{1}{3} \cdot I_{star} = \frac{1}{3} \cdot (I_u + I_v + I_w) = I_0$.

The additional degree of freedom resulting from the enhanced Clarke-Park transformation in comparison to the Clarke-Park transformation is further exploited in a clever manner.

A controller 20 is associated with the electric motor which has input values and output values as well as reference values. Like in field-oriented control, which is familiar to a person skilled in the art, a field-building reference current (I*d) and a torque-building reference current (I*q) act as reference values for the electric motor. The prescribing of these target values results from an operating strategy of the electric motor and follows substantially from a torque demand on the electric motor. This is not subject matter of the present document.

The field-building current (Id) and the torque-building current (Iq) act as control variables corresponding to reference values (I*d) and (I*q). The controller outputs a first stator control voltage (Ud) and a second stator control voltage (Uq) as actuating variables. The part of the controller that outputs the first and the second stator control voltage is referred to as a stator current controller 22.

The stator current controller is expanded by an additional controller, which is referred to as a star point controller 24. A star point reference current (I*star) serves as a reference value, the star point current (Istar) serving as a control variable. For this purpose, the star point controller outputs a third stator control voltage (U0) as an additional actuating variable of the system.

As a result, a substantial advantage of the system from FIG. 1 is established since, via the connection of the star point (1a) to the second onboard electrical subsystem, a targeted star point current from the star point to the second onboard electrical subsystem or from the second onboard electrical subsystem to the star point can be set. The degree of freedom of the system from FIG. 1, which results from the electrical connection of the star point (1a) to the second onboard electrical subsystem as opposed to an electrically isolated stator system, is taken into account in the control of the electric motor through the expansion of the Clarke-Park matrix and the introduction of the current zero component.

In the controlled system, the additional degree of freedom is taken into account as a result of the fact that, besides the stator current controller from FOC, which is known to a person skilled in the art, the additional star point controller with a target value for the star point current is implemented.

The rotor-fixed control voltages $U_d$, $U_q$ and $U_0$ obtained from the stator current controller and the star point controller are converted by means of an inverse transformation to the stator-fixed voltage values $U_u$, $U_v$ and $U_w$ for each phase, which can be set via the inverter (2) on the electric motor in the respective cycle.

The inverse transformation is referred to as an enhanced inverse Clarke-Park transformation and transforms the obtained control voltages according to the specification:

$$\begin{bmatrix} U_U \\ U_V \\ U_W \end{bmatrix} = \begin{bmatrix} \cos(\beta_{el}) & -\sin(\beta_{el}) & 1 \\ \cos(\beta_{el} - 120°) & -\sin(\beta_{el} - 120°) & 1 \\ \cos(\beta_{el} + 120°) & -\sin(\beta_{el} + 120°) & 1 \end{bmatrix} \cdot \begin{bmatrix} U_d \\ U_q \\ U_0 \end{bmatrix} \quad \text{(Equation 2)}$$

This means that the inverse Clarke-Park transformation indicates the phase voltages to be set in the respective cycle.

The 3×3 matrix from equation 2 is the transformation matrix that is the inverse of the 3×3 matrix from equation 1.

The stator-fixed voltage values obtained from equation 2 can be set via the inverter (2) through addition of the voltage $U_{Zk}$ of the DC voltage link (3) using a method known to a person skilled in the art, e.g., using the method of pulse-width modulation by setting appropriate switching times of the high-side switch and of the low-side switch of the respective half bridge belonging to the respective phase.

This makes it possible to set a star point current of the electric motor predetermined by the reference value $I^*_{star}$. This is true independently of whether the electric motor is located in a generator- or motor-based operating state or is in shutdown or idling. The targeted setting of the star point current has an especially advantageous effect in the vehicle, for example in the case of a nominal voltage of the first onboard electrical subsystem of 48 volts and a nominal voltage of the second onboard electrical subsystem of 12 volts: The 12-volt onboard electrical subsystem can be supplied with electrical power via the star point current. This makes a separate generator unnecessary in the 12-volt onboard electrical subsystem. Above all, however, no DCDC converter is required for the transfer of power between the two onboard electrical subsystems. Electrical power can be transferred bi-directionally between the two onboard electrical subsystems through the direction of the star point controller. In other words, the electric motor assumes the function of a DCDC converter with the very sparing use of components. This saves weight, cost and installation space. Moreover, the two onboard electrical subsystems can be mutually supported through the setting of the star point current, i.e., voltage stabilization can be achieved through the adjustable star point current. What is more, the distribution of energy flow in the vehicle can be implemented in a wide range of ways—during recuperation, for example. If no recuperation power can be taken from the 48-volt onboard electrical subsystem, for instance, it can be diverted into the 12-volt onboard electrical system. This increases the recuperation potential.

According to another embodiment, another supply system can be selected for the control by the stator current controller and the star point controller—for example, by measuring an arbitrary selection of two phase currents and, in addition, the star point current $I_{star}$, instead of measuring the three phase currents ($I_u$, $I_v$, $I_w$). The transformation to values that are as suitable as possible for the control input is then performed by means of a commensurately modified enhanced Clarke-Park transformation and a commensurately modified enhanced inverse Clarke-Park transformation.

Likewise, an appropriate adaptation of equation 1 and equation 2 in analogous fashion is necessary if the electric motor has a phase number other than N=3 like in the first exemplary embodiment. In a 5-phase motor where N=5, five current measurements (e.g., measurement of the five phase currents) is performed, and the matrixes are respectively formed as 5×5 matrixes for the Clarke-Park transformation and for the inverse Clarke-Park transformation.

In the depicted embodiments, the inverter is a component of a power-electronic unit which comprises the stator current controller, the star point controller and current measurement means 26 for the measurement of the currents. The current measurements can be done via Hall sensors or shunt resistance, for example. A subsequent conversion of the analog measurement signals into digitally processable signals is preferably performed by A/D conversion in a microcontroller of the power-electronic unit. The stator current controller and the star point controller are preferably implemented in the form of a microcontroller or an FPGA.

According to the embodiments described, the star point of the electric motor is optionally linked in via the star point switch. This is especially advantageous. In the case of a permanent, fixed connection of the star point to the second onboard electrical subsystem, and with a controlled star point current, the electric motor reaches the so-called field weakening range earlier, that is, at a lower speed. The earlier onset of field weakening range has the effect that, at a certain speed, the machine is capable of outputting a lower torque than if the star point were not electrically connected. The opening of the star point switch suppresses the star point current and increases the torque that can be taken off at the given speed.

In the case of an electric motor with a star point that is not electrically connected, i.e., in an electric motor driven conventionally via space vector modulation, the zero vectors are uniformly distributed, and it is possible to operate the voltage of the respective phase at a maximum value of $U_{Zk}/\sqrt{3}$. The voltage at the star point then fluctuates around the value $U_{Zk}/2$. Uniformly distributed zero vectors in FOC are known to a person skilled in the art and mean that the zero times, i.e., the times at which either all phases are switched to the higher electrical potential or all phases are switched to the lower electrical potential, are distributed to the greatest possible extent in a switching cycle.

If the star point is connected permanently to the second onboard electrical subsystem, the star point current fluctuates around the voltage value $U_{Bn}/12$, the voltage $U_{Bn}$ describing the voltage value of the DC voltage link (12). This has the drawback that the speed (the so-called nominal speed) starting at which the field weakening range begins in the direction of higher speeds decreases in the direction of lower speeds. The electric motor therefore cannot be optimally exploited in relation to the provided torque. The zero vectors cannot be freely distributed. This resulted in a reduction of the maximum phase voltage and thus the shifting of the nominal speed to lower motor speeds.

The opening of the star point switch suppresses the shifting of the nominal speed to lower motor speeds and thus the reduction of the mechanical power than can be provided by off the motor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising:
   an N-phase electric motor, including a rotor and a star circuit stator system with a star point;
   a first onboard electrical subsystem having an inverter associated with the stator system;
   a second onboard electrical subsystem connected to the star point via a star point switch; and
   an inverter controller configured to operate the electric motor according to the principle of field-oriented control, the inverter controller including:
   a current controller that controls phase currents of the stator system, and
   a star point controller that controls a star point current in accordance with the following enhanced Clarke-Park transformation:

$$\begin{bmatrix} I_d \\ I_q \\ I_0 \end{bmatrix} = 2/3 \cdot \begin{bmatrix} \cos(\beta_{el}) & \cos(\beta_{el} - 120°) & \cos(\beta_{el} + 120°) \\ -\sin(\beta_{el}) & -\sin(\beta_{el} - 120°) & -\sin(\beta_{el} + 120°) \\ \frac{1}{2} & \frac{1}{2} & \frac{1}{2} \end{bmatrix} \cdot \begin{bmatrix} I_u \\ I_v \\ I_w \end{bmatrix},$$

where $I_u$, $I_v$, and $I_w$ are measured phase currents, $\beta_{el}$ is an electrical angle of the rotor, $Z_p$ is a number of pole pairs of the electric motor, $I_d$ is field-building component, $I_q$ a torque-building component, and $I_0$ is a zero current component.

2. The vehicle as set forth in claim 1, wherein the vehicle comprises one of (i) measurement means for measuring a number of at least N−1 phase currents and the star point current and (ii) measurement means for measuring a number of at least N phase currents, and the vehicle has a control unit which comprises the inverter controller.

3. The vehicle as set forth in claim 2,
   wherein the measurement means measures N currents of the electric motor, and the control unit transforms the measured currents by the enhanced Clarke-Park transformation into a field-oriented current vector with the field-building component, with the torque-building component and with the zero current component, and
   wherein the star point current is three times the zero current component.

4. The vehicle as set forth in claim 3, wherein
   the inverter controller has the field-building current component as a control variable,
   the inverter controller has the torque-building current component as a control variable,
   the inverter controller has the zero current component as a control variable,
   the inverter controller has a first reference current value for the field-building current component as a reference value,
   the inverter controller has a second reference current value for the torque-building current component as a reference value,
   the inverter controller has a star point reference current for the star point controller as a reference value,
   the inverter controller outputs a first stator control voltage as an actuating variable,
   the inverter controller outputs a second stator control voltage as an actuating variable, and
   the inverter controller outputs a third stator control voltage as an actuating variable.

5. The vehicle as set forth in claim 4, wherein the current controller and the star point controller are embodied substantially as PI controllers.

6. The vehicle as set forth in claim 4, wherein
   the N-phase electric motor is embodied as a 3-phase electric motor,
   the inverter comprises six inverter switches,
   the six inverter switches are arranged in three half bridges for the three phases of the stator system,
   the first stator control voltage, the second stator control voltage and the third stator control voltage are transformable by an enhanced inverse Clarke-Park transformation into phase voltages of the stator system, and
   the inverter, in a switching cycle according to the principle of pulse-width modulation, switches the phase voltage for each of the phases.

7. The vehicle as set forth in claim 2, wherein, when the star point switch is closed, the electric motor is configured to, in the case of a star point current with a direction of flow from the star point to the second onboard electrical subsystem, transfer electrical power from the first onboard electrical subsystem to the second onboard electrical subsystem and act as a step-down converter.

8. The vehicle as set forth in claim 3, wherein, when the star point switch is closed, the electric motor is configured to, in the case of a star point current with a direction of flow from the second onboard electrical subsystem to the star point, transfer electrical power from the first onboard electrical subsystem to the second onboard electrical subsystem and act as a step-down converter.

9. The vehicle as set forth in claim 4, wherein, when the star point switch is closed, the electric motor is configured to, in the case of a star point current with a direction of flow from the second onboard electrical subsystem to the star point, transfer electrical power from the first onboard electrical subsystem to the second onboard electrical subsystem and act as a step-down converter.

10. The vehicle as set forth in claim 2, wherein, when the star point switch is closed, the electric motor is configured to, in the case of a star point current with a direction of flow from the second onboard electrical subsystem to the star point, transfer electrical power from the second onboard electrical subsystem to the first onboard electrical subsystem and act as a step-up converter.

11. The vehicle as set forth in claim 3, wherein, when the star point switch is closed, the electric motor is configured to, in the case of a star point current with a direction of flow from the second onboard electrical subsystem to the star point, transfer electrical power from the second onboard electrical subsystem to the first onboard electrical subsystem and act as a step-up converter.

12. The vehicle as set forth in claim 4, wherein, when the star point switch is closed, the electric motor is configured to, in the case of a star point current with a direction of flow from the second onboard electrical subsystem to the star point, transfer electrical power from the second onboard electrical subsystem to the first onboard electrical subsystem and act as a step-up converter.

13. The vehicle as set forth in claim 4, wherein the star point current is configured to be set through prescription of the reference star point current and adjustment of the star point control voltage, and the electric motor is configured to act as one of a unidirectional and bidirectional power controller when the star point switch is closed.

14. The vehicle as set forth in claim 6, wherein the inverter controller is configured to set the star point current through prescription of the target star point current and adjustment of the star point control voltage, and the electric motor is configured to act as one of a unidirectional and bidirectional power controller when the star point switch is closed.

15. The vehicle as set forth in claim 7, wherein the inverter controller is configured to set the star point current through prescription of the target star point current and adjustment of the star point control voltage, and the electric motor is configured to act as one of a unidirectional and bidirectional power controller when the star point switch is closed.

16. The vehicle as set forth in claim 10, wherein the inverter controller is configured to set the star point current through prescription of the target star point current and adjustment of the star point control voltage, and the electric motor is configured to act as one of a unidirectional and bidirectional power controller when the star point switch is closed.

\* \* \* \* \*